US012597369B2

(12) United States Patent
Gibbs De Abreu

(10) Patent No.: US 12,597,369 B2
(45) Date of Patent: Apr. 7, 2026

(54) CRYPTO RECOVERY SEED PHRASE STORAGE DEVICE

(71) Applicant: Javier Antonio Gibbs De Abreu, Atlanta, GA (US)

(72) Inventor: Javier Antonio Gibbs De Abreu, Atlanta, GA (US)

( * ) Notice: Subject to any disclaimer, the term of this patent is extended or adjusted under 35 U.S.C. 154(b) by 66 days.

(21) Appl. No.: 18/602,162

(22) Filed: Mar. 12, 2024

(65) Prior Publication Data

US 2025/0292706 A1       Sep. 18, 2025

(51) Int. Cl.
*G09C 1/04*       (2006.01)
*E05B 37/00*       (2006.01)

(52) U.S. Cl.
CPC ............ *G09C 1/04* (2013.01); *E05B 37/0006* (2013.01)

(58) Field of Classification Search
CPC .............................. G09C 1/04; E05B 37/0006
USPC ......................................................... 380/57
See application file for complete search history.

(56) References Cited

U.S. PATENT DOCUMENTS

| | | | | |
|---|---|---|---|---|
| 2,688,198 | A * | 9/1954 | Neff | G09C 1/04 380/58 |
| 6,638,072 | B1 * | 10/2003 | Sarconi | G09B 1/20 273/153 S |
| 7,203,146 | B2 | 4/2007 | Baik | |
| 8,239,691 | B2 | 8/2012 | Watanabe et al. | |
| 10,348,025 | B2 | 7/2019 | Zhang et al. | |
| 11,093,934 | B2 | 8/2021 | Lu et al. | |
| 11,212,093 | B2 | 12/2021 | Chiu et al. | |
| 11,386,425 | B2 | 7/2022 | Silvestri et al. | |
| 11,663,589 | B2 | 5/2023 | Vanham et al. | |
| 11,777,727 | B1 | 10/2023 | Anderson et al. | |
| 2013/0291092 | A1 | 10/2013 | Andreadis | |
| 2014/0344923 | A1 | 11/2014 | Wang et al. | |
| 2019/0362340 | A1 | 11/2019 | Strong et al. | |
| 2021/0194687 | A1 * | 6/2021 | Heu | H04L 9/3239 |
| 2023/0252456 | A1 | 8/2023 | Rapowitz et al. | |
| 2023/0274671 | A1 * | 8/2023 | Lowe | H04L 9/0897 40/495 |
| 2023/0396456 | A1 | 12/2023 | Anderson et al. | |

OTHER PUBLICATIONS

Cryptosteel Capsule Solo, Sep. 14, 2021 at https://web.archive.org/web/20210901165624/https://shop.ledger.com/products/cryptosteel-capsule-solo ()retrieved on Jul. 15, 2025). All Pages (Year: 2021).*
Cryptosteel, "How to Use Capsule—Cryptosteel", Dec. 15, 2023 (retrieved using Wayback Machine on Archive.org), pp. 1-12 (Year: 2023).*

* cited by examiner

*Primary Examiner* — Michael S McNally
(74) *Attorney, Agent, or Firm* — Dunlap Bennett & Ludwig PLLC

(57)       ABSTRACT

A seed phrase storage device includes a holding rod and a sequence of encoding disks configured to represent a word in a seed phrase. Each encoding disk comprises an encoding disk hole and a physical representation of a number, where the encoding disk hole enables each encoding disk to slide onto the holding rod. The storage device includes at least one separator nut including a separator nut hole that enables the separator nut to attach to the holding rod. The at least one separator nut separates a first sequence of encoding disks and a second sequence of encoding disks. The storage device includes at least one anchor nut configured to secure the separator nut and the sequence of encoding disks to the holding rod.

6 Claims, 4 Drawing Sheets

CRYPTO RECOVERY SEED PHRASE STORAGE DEVICE

FIELD

The present disclosure relates to cryptography and, more particularly, to cryptographic keys and key phrase storage devices and methods.

BACKGROUND

Cryptographic keys and seed phrases are critical in the cryptographic process. For example, the key and/or seed phases are required to utilize or transfer cryptographic currency. The keys or seed phrases are typically stored in non-electronic mediums, such as physical paper. These mediums, however, are susceptible to being lost or stolen.

As can be seen, there is a need for physical storage mediums that address the above drawbacks.

SUMMARY

In one aspect of the present disclosure, a seed phrase storage device includes a holding rod and a sequence of encoding disks configured to represent a word in a seed phrase. Each encoding disk comprises an encoding disk hole and a physical representation of a number, where the encoding disk hole enables each encoding disk to slide onto the holding rod. The storage device includes at least one separator nut including a separator nut hole that enables the separator nut to slide on the holding rod. The at least one separator nut separates a first sequence of encoding disks and a second sequence of encoding disks. The storage device includes at least one anchor nut configured to secure the separator nut and the sequence of encoding disks to the holding rod.

DETAILED DESCRIPTION OF THE DISCLOSURE

The following detailed description is of the best currently contemplated modes of carrying out exemplary embodiments of the disclosure. The description is not to be taken in a limiting sense but is made merely for the purpose of illustrating the general principles of the disclosure, since the scope of the disclosure is best defined by the appended claims.

As discussed above, currently user maintain seed phrases and seed words in physical media. For example, a user would write down their recovery seed phrase on a piece of paper (usually 12 or 24 words). Or, the user would write down the corresponding number from each of the words from the Bitcoin improvement Proposal 39 (BIP39) list (or a different list depending on the setup of their crypto wallet). However, this information can be easily lost or stolen.

Broadly, an embodiment of the present disclosure provides a crypto recovery seed phrase storage device that stores a seed phrase in a manner that ensures the recovery seed phrase will be safe against the elements and other threats that might result in the loss of control of a user's crypto wallet. The storage device includes encoding disks that include physical representations of numbers associated with each seed phrase word. The encoding disks are arranged on a holding rod of the storage device in a sequence that represents the seed phrase.

Referring now to FIGS. 1-5, FIGS. 1-5 illustrate a crypto recovery seed phrase storage device 10 (hereinafter the storage device 10), according to aspects of the present disclosure. While FIGS. 1-5 illustrate examples of components of the storage device 10, additional components can be added and existing components can be removed and/or modified.

Figures 1, 2:
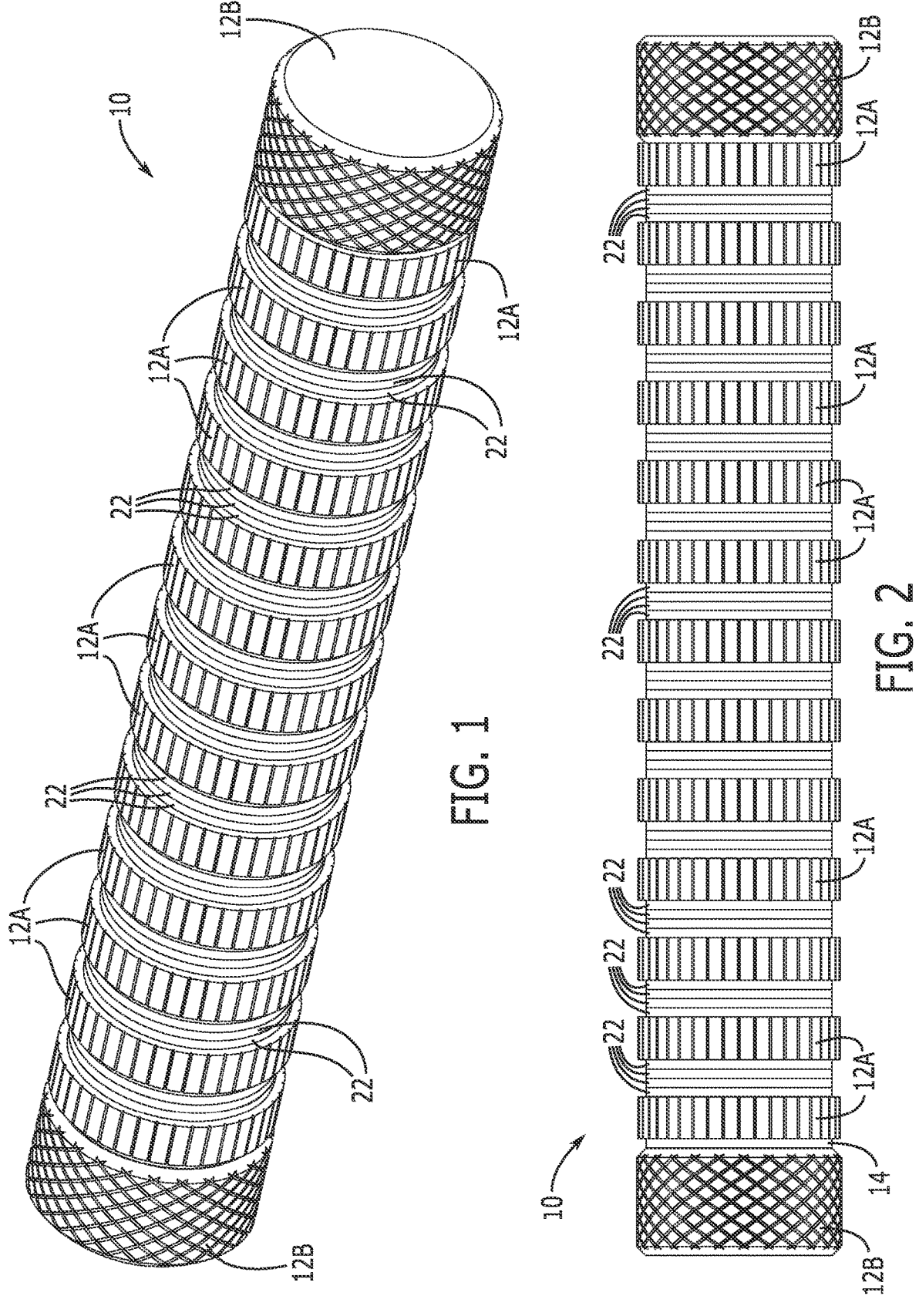
FIG. 1 is a side perspective view of a crypto recovery seed phrase storage device, according to aspects of the present disclosure.
FIG. 2 is a side elevation view of the crypto recovery seed phrase storage device of FIG. 1, according to aspects of the present disclosure.
Figure 3:
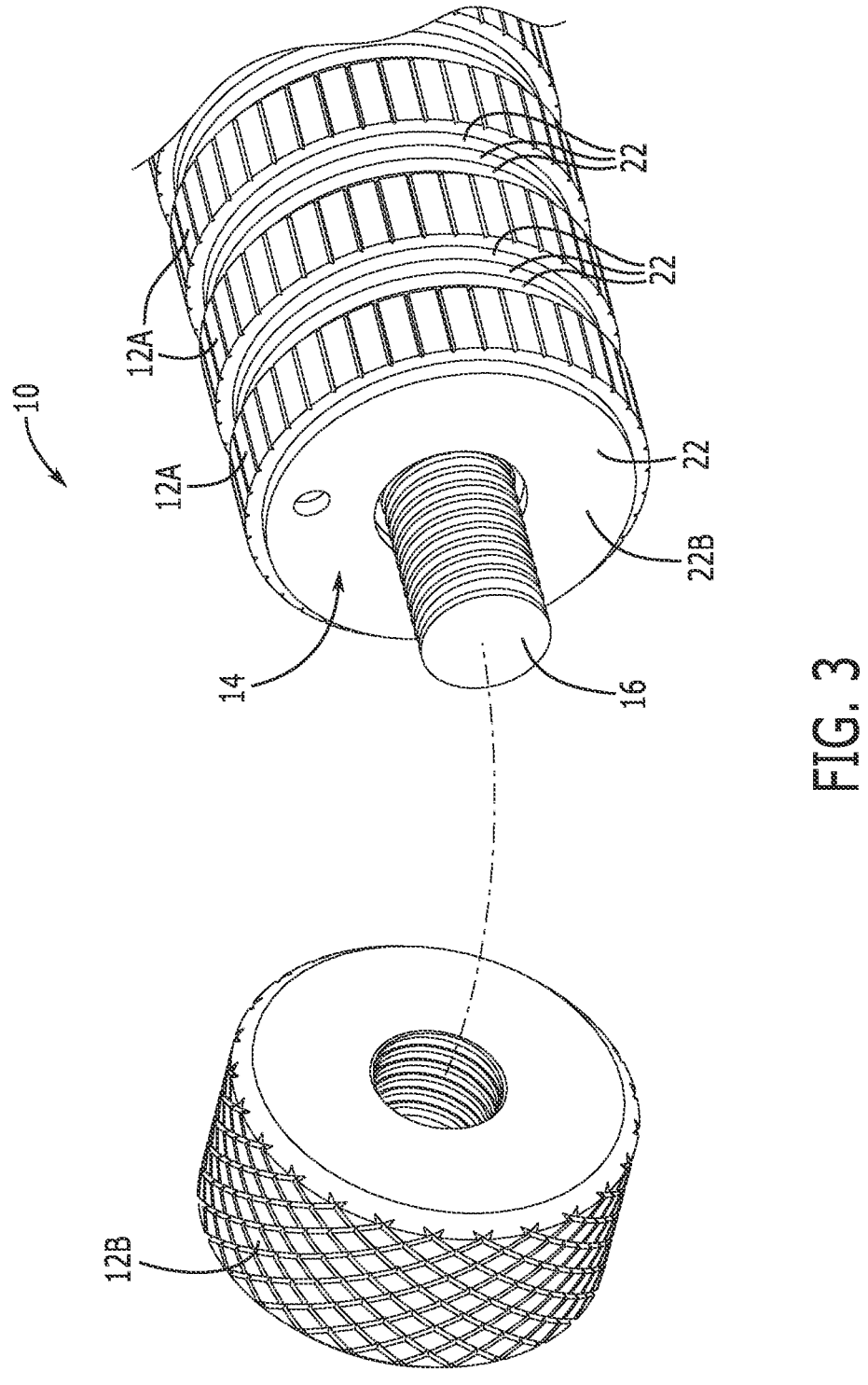
FIG. 3 is an exploded view of a portion of the crypto recovery seed phrase storage device of FIG. 1, according to aspects of the present disclosure.

As illustrated in FIGS. 1 and 2, the storage device 10 includes a series of encoding disks 22 that are separated by separator nuts 12A. The encoding disks 22 are placed on a holding rod 16 in a sequence that stores a seed phrase that are separated by the separator nuts 12A. The encoding disks 22 can be held on the holding rod 16 by separator nuts 12A, and at each end by anchor nuts 12B. As illustrated in FIG. 3, the holding rod 16, the separator nuts 12A and the anchor nuts 12B can be threaded, thereby allowing the separator nuts 12A and anchor nuts 12B to hold the encoding disks 22 on the holding rod.

In embodiments, a seed phrase can be composed of a number of seed words. The seed phrase is utilized to generate or re-generate a cryptographic key. Each seed word of the seed phase can be represented by a sequence of the encoding disks 22, where each of the encoding disks 22 includes a physical representation for a portion of the seed word. The sequence of encoding disks 22 can be grouped together in a specific order and capped on each end by the separator nuts 12, thereby representing a seed word in the seed phrase. Each seed word of the seed phrase is stored as a sequence of encoding disks 22 that are placed in order on the holding rod 16 thereby storing and encoding the seed phrase.

Figure 5:
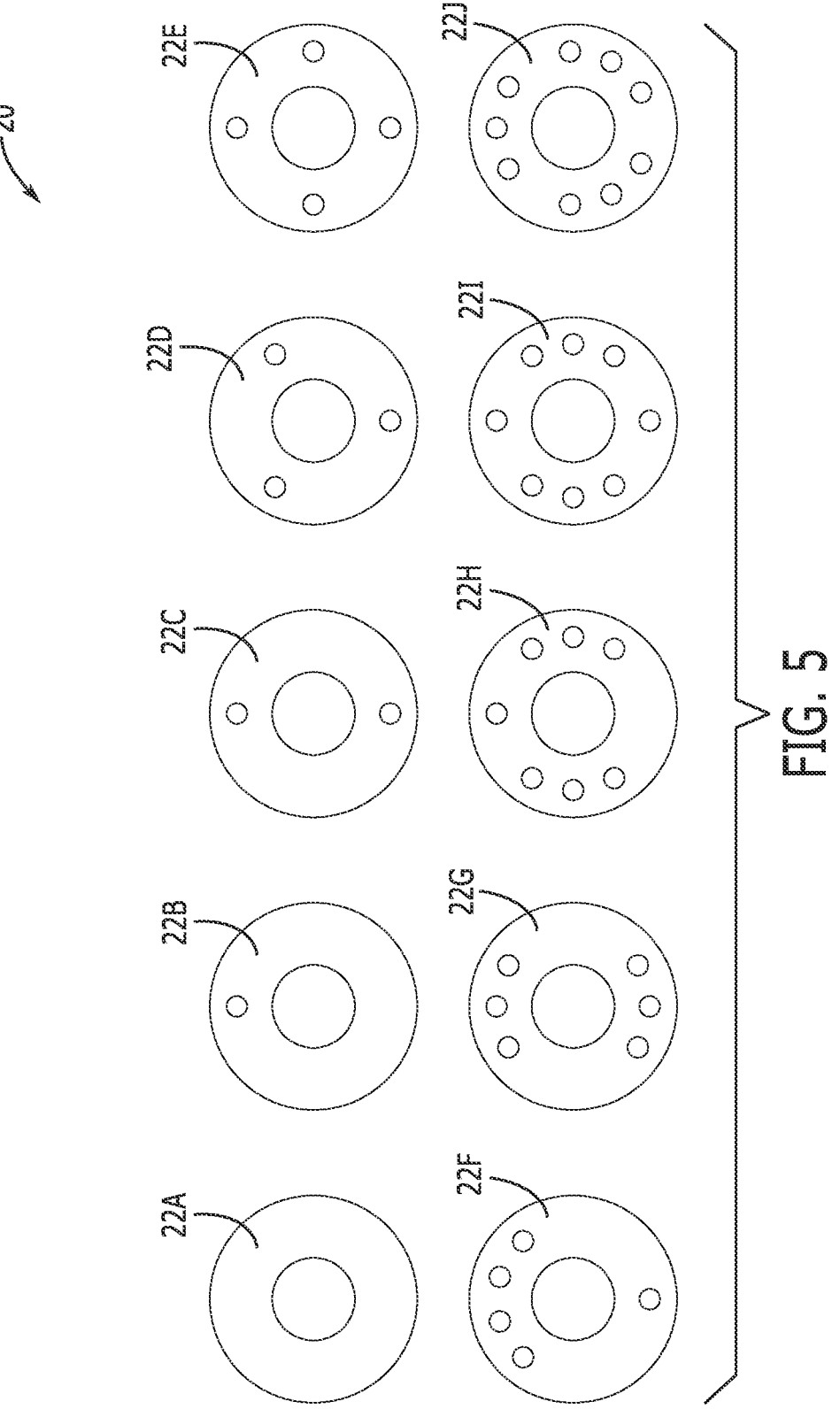
FIG. 5 is a side elevation view of encoding disks of the crypto recovery seed phrase storage device of FIG. 1, according to aspects of the present disclosure.

In embodiments, the encoding disks 22 can include a set of encoding disks that include physical representation of number names. As illustrated in FIG. 5, the encoding disks 22 can include a set of encoding disks 22A-22F where each disk has a unique physical representation of a number. For example, encoding disk 22A has a zero (0) holes that extend from a front side of the encoding disk 22A to a back side of the encoding disk 22A, thereby representing the number zero (0). Encoding disk 22B has a one (1) hole that extends from a front side of the encoding disk 22B to a back side of the encoding disk 22B, thereby representing the number one (1). Encoding disk 22C has two (2) holes that extend from a front side of the encoding disk 22C to a back side of the encoding disk 22C, thereby representing the number two (2). Encoding disk 22D has three (3) holes that extend from a front side of the encoding disk 22D to a back side of the encoding disk 22D, thereby representing the number three (3). Encoding disk 22E has four (4) holes that extend from a front side of the encoding disk 22E to a back side of the encoding disk 22E, thereby representing the number four (4). Encoding disk 22F has five (5) holes that extend from a front side of the encoding disk 22F to a back side of the encoding disk 22F, thereby representing the number five (5). Encoding disk 22G has six (6) holes that extend from a front side of the encoding disk 22G to a back side of the encoding disk 22G, thereby representing the number six (6). Encoding disk 22H has seven (7) holes that extend from a front side of the encoding disk 22H to a back side of the encoding disk 22H, thereby representing the number seven (7). Encoding disk 22I has eight (8) holes that extend from a front side of the encoding disk 22I to a back side of the encoding disk 22I, thereby representing the number eight (8). Encoding disk 22J has nine (9) holes that extend from a front side of the encoding disk 22J to a back side of the encoding disk 22J, thereby representing the number nine (9).

Figure 4:
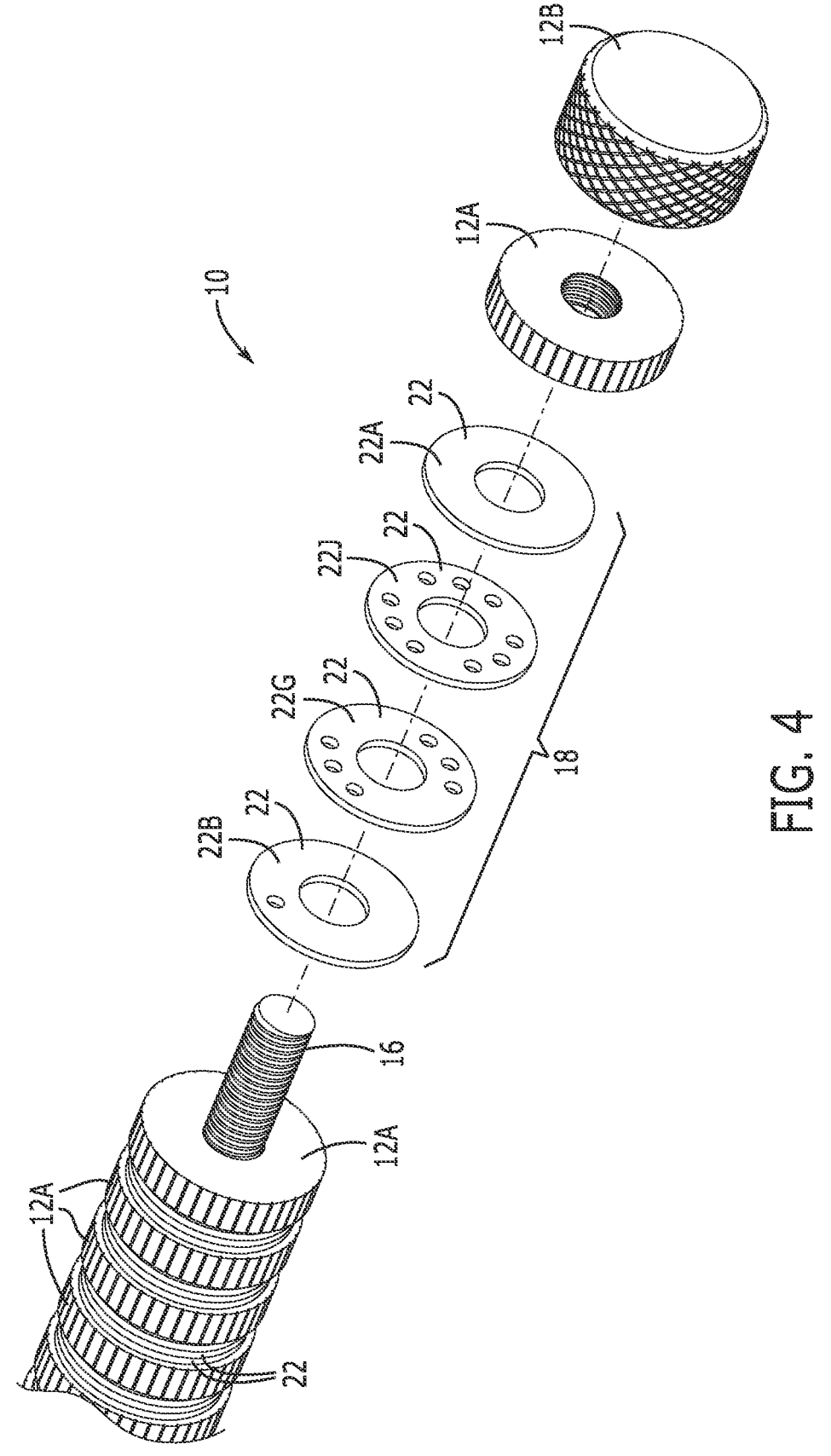
FIG. 4 is another exploded view of a portion of the crypto recovery seed phrase storage device of FIG. 1, according to aspects of the present disclosure.

As illustrated in FIG. 4, the seed word 18 can be encoded using a sequence of encoding disks 22 that encode the word. The seed word 18 include an encoding disk 22B, an encoding disk 22G, an encoding disk 22J, an encoding disk 22A, thereby representing the number "1690". This number can correspond to a word in a codex such as BIP 39. In some embodiments, as illustrated in FIG. 3, the storage device 10 can include a first encoding disk 14 that is placed at the beginning of the seed phrase. The first encoding disk 14 can be utilized to encode other information about the seed phrase. For example, the first encoding disk 14 can represent the start of the seed phrase. For example, the first encoding disk 14 can be utilized to encode a reference to a codex used to decode the seed words, information used to decode the physical representation on the encoding disks 22, and the like.

In one example of the operation of the storage device 10, to store a complete seed phase, for example, a 12-word seed phase, a user can attach an anchor nut 22B at one end of the holding rod 16. The user can then install the first encoding disk 14 on the holding rod to abut the anchor nut 22B. Then, the user can add a separator nut 12A to the holding rod 16 to abut the first encoding disk 14. Next, the user can add a sequence of encoding disks 22 that represent a seed word to the holding rod 16 to abut the separator nut 12A. Then, a new separator nut 12A can be added to the holding rod 16 to abut the opposing end of the sequence of encoding disks 22. This is repeated for each word in the seed phase. Once all the words are entered, an anchor nut 22B is added to the opposing end of the holding rod. In embodiments, the holding rod 16 can be in different lengths to accommodate seed phases having different numbers of words and/or different codex having different word lengths.

In embodiments, once the anchor nuts 22B are added to the holding rod 16, the encoding disks 22 and the separator nuts 12A are secured and held on the holding rod 16. Moreover, because the physical representations, e.g., holes, are positioned on the sides of the encoding disks 22, these representations are not visible upon inspection of the storage device 10. As such, a third party cannot obtain the seed phrase by surface inspection of the storage device 10.

As used in the description herein and throughout the claims that follow, "a", "an", and "the" include plural references unless the context clearly dictates otherwise. Also, as used in the description herein and throughout the claims that follow, the meaning of "in" includes "in" and "on" unless the context clearly dictates otherwise. While the above is a complete description of specific examples of the disclosure, additional examples are also possible. Thus, the above description should not be taken as limiting the scope of the disclosure which is defined by the appended claims along with their full scope of equivalents.

The foregoing disclosure encompasses multiple distinct examples with independent utility. While these examples have been disclosed in a particular form, the specific examples disclosed and illustrated above are not to be considered in a limiting sense as numerous variations are possible. The subject matter disclosed herein includes novel and non-obvious combinations and sub-combinations of the various elements, features, functions and/or properties disclosed above both explicitly and inherently. Where the disclosure or subsequently filed claims recite "a" element, "a first" element, or any such equivalent term, the disclosure or claims is to be understood to incorporate one or more such elements, neither requiring nor excluding two or more of such elements. As used herein regarding a list, "and" forms a group inclusive of all the listed elements. For example, an example described as including A, B, C, and D is an example that includes A, includes B, includes C, and also includes D. As used herein regarding a list, "or" forms a list of elements, any of which may be included. For example, an example described as including A, B, C, or D is an example that includes any of the elements A, B, C, and D. Unless otherwise stated, an example including a list of alternatively-inclusive elements does not preclude other examples that include various combinations of some or all of the alternatively-inclusive elements. An example described using a list of alternatively-inclusive elements includes at least one element of the listed elements. However, an example described using a list of alternatively-inclusive elements does not preclude another example that includes all of the listed elements. And, an example described using a list of alternatively-inclusive elements does not preclude another example that includes a combination of some of the listed elements. As used herein regarding a list, "and/or" forms a list of elements inclusive alone or in any combination. For example, an example described as including A, B, C, and/or D is an example that may include: A alone; A and B; A, B and C; A, B, C, and D; and so forth. The bounds of an "and/or" list are defined by the complete set of combinations and permutations for the list.

It should be understood, of course, that the foregoing relates to exemplary embodiments of the disclosure and that modifications can be made without departing from the spirit and scope of the disclosure as set forth in the following claims.

What is claimed is:

1. A seed phrase storage device, comprising:
   a holding rod;
   a first plurality of threads extending along the length of the holding rod;
   a sequence of encoding disks configured to represent a word in a seed phrase, each encoding disk comprising an encoding disk hole and a physical representation of a number, wherein the encoding disk hole enables each encoding disk to slide onto the holding rod;
   at least one separator nut comprising a separator nut hole that enables the separator nut to slide on the holding rod, wherein the at least one separator nut separates a first sequence of encoding disks and a second sequence of encoding disks;
   at least one anchor nut configured to secure the separator nut and the sequence of encoding disks to the holding rod; and
   wherein the physical representation of the number comprises: one or more holes extending from a first side of each encoding disk to a second side of each encoding disk, an amount of the one or more holes representing the number.

2. The seed phrase storage device of claim 1, wherein the at least one anchor nut comprises:

a second plurality of threads configured to engage the first plurality of threads and secure the at least one anchor nut to the holding rod.

3. The seed phrase storage device of claim 2, wherein the at least one anchor nut comprises:

a first anchor nut coupled to a first end of the holding rod; and a second anchor nut coupled to a second end of the holding rod.

4. The seed phrase storage device of claim 1, wherein the number correlates to an entry in a cryptographic codex.

5. The seed phrase storage device of claim 1, wherein the at least one separator nut comprises:

a third plurality of threads configured to engage the first plurality of threads and secure the at least one separator nut to the holding rod; and a first separator nut positioned at a first side of the sequence of encoding disks; and a second separator nut positioned at a second side of sequence of encoding disks.

6. The seed phrase storage device of claim 1, wherein the physical representation of the number of each encoding nut is not visible when placed on the holding rod.

\*   \*   \*   \*   \*